US010986062B2

(12) United States Patent
Bhagwan et al.

(10) Patent No.: US 10,986,062 B2
(45) Date of Patent: Apr. 20, 2021

(54) SUBSCRIPTION TRANSFER

(71) Applicant: Yahoo!, Inc., Sunnyvale, CA (US)

(72) Inventors: Varun Bhagwan, Los Gatos, CA (US); Robert Douglas Sharp, San Francisco, CA (US)

(73) Assignee: Verizon Media Inc., New York, NY (US)

( * ) Notice: Subject to any disclaimer, the term of this patent is extended or adjusted under 35 U.S.C. 154(b) by 425 days.

(21) Appl. No.: 15/343,928

(22) Filed: Nov. 4, 2016

(65) Prior Publication Data
US 2018/0131658 A1    May 10, 2018

(51) Int. Cl.
*H04L 12/58* (2006.01)
*H04W 12/00* (2021.01)
*H04W 12/06* (2021.01)

(52) U.S. Cl.
CPC .............. *H04L 51/28* (2013.01); *H04L 51/22* (2013.01); *H04W 12/00* (2013.01); *H04W 12/06* (2013.01)

(58) Field of Classification Search
CPC .......... H04L 51/28; H04L 51/22; H04L 67/26
See application file for complete search history.

(56) References Cited

U.S. PATENT DOCUMENTS

| | | | |
|---|---|---|---|
| 2002/0103932 A1* | 8/2002 | Bilbrey ................ | G06Q 10/107 709/245 |
| 2007/0078786 A1* | 4/2007 | Bous et al. | |
| 2009/0228564 A1* | 9/2009 | Hamburg ............. | G06Q 10/107 709/206 |
| 2013/0238721 A1* | 9/2013 | Patel ...................... | H04L 51/12 709/206 |
| 2014/0115067 A1* | 4/2014 | Rosenwald .......... | G06Q 10/107 709/206 |
| 2015/0256499 A1* | 9/2015 | Kumar .................... | H04L 51/28 709/206 |
| 2015/0304849 A1* | 10/2015 | Moon ..................... | H04L 51/18 455/411 |
| 2015/0381561 A1* | 12/2015 | Meltzer ............... | H04L 61/1511 709/206 |
| 2018/0131658 A1* | 5/2018 | Bhagwan ................ | H04L 51/28 |

* cited by examiner

*Primary Examiner* — Philip J Chea
*Assistant Examiner* — Mohammed Ahmed
(74) *Attorney, Agent, or Firm* — Cooper Legal Group, LLC

(57) ABSTRACT

One or more computing devices, systems, and/or methods for transferring subscriptions are provided. For example, a user (e.g., and/or a device associated with the user) of a communication platform may request to transfer a plurality of subscriptions from a first account to a second account. Access information associated with the first account may be used to access a first storage space of the first account, the plurality of subscriptions may be identified based upon the first storage space, and the plurality of subscriptions may (e.g., concurrently) be transferred from the first account to the second account.

20 Claims, 13 Drawing Sheets

501

500

Sign up

502 — First name | Last name

504 — Email address

506 — Password

508 — +1 ▽ | Mobile phone number

510 — Birth Month ▽ | Day ▽ | Year ▽

512 — Gender (optional) ▽

514 — ☑ Transfer subscriptions from existing email address

Transfer subscriptions - backend

EXISTING EMAIL ACCESS INFORMATION RECEIVED FROM USER:

EMAIL ADDRESS: USER121@EXISTINGMAIL.COM — 526

PASSWORD: SECURE232 — 528

SERVER ASSOCIATED WITH EXISTING EMAIL:

EXISTINGMAIL.COM — 530

SENDING MESSAGE TO SERVER ASSOCIATED WITH EXISTING EMAIL:

PROVIDE ACCESS TO MAILBOX OF — 532
USER121@EXISTINGMAIL.COM

USERNAME: USER121 — 534
PASSWORD: SECURE232

FIG. 5C

Transfer subscriptions - backend

EXISTING EMAIL INVENTORY:

| DATE | SENDER | RECIPIENT(S) | SUBJECT |
|---|---|---|---|
| 5/1/16 | INFO@4XT2.COM | USER121 | YOUR ORDER #12 |
| 5/12/16 | WEB@GO4.COM | USER121+4 | SHARED LINK |
| 5/14/16 | DEAL@SHOP.COM | NONE | SPECIAL DEAL |
| 5/22/16 | CT@SPORT.COM | USER121+3,000 | WEEKLY UPDATE |

. . .

SUBSCRIPTIONS IDENTIFIED IN EXISTING EMAIL:

FIRST SUBSCRIPTION – SPORT.COM

SECOND SUBSCRIPTION – SHOP.COM

THIRD SUBSCRIPTION – NEWSUPDATE.COM

FIG. 5D

Transfer subscriptions - backend

SENDING MESSAGE TO SERVER ASSOCIATED WITH EXISTING EMAIL:

COPY MESSAGES ASSOCIATED WITH FIRST SUBSCRIPTION (FROM SPORT.COM) AND SECOND SUBSCRIPTION (FROM SHOP.COM) FROM MAILBOX OF USER121@EXISTINGMAIL.COM

CREATE RULE TO COPY NEW FUTURE MESSAGES ASSOCIATED WITH FIRST SUBSCRIPTION (FROM SPORT.COM) AND SECOND SUBSCRIPTION (FROM SHOP.COM) FROM MAILBOX OF USER121@EXISTINGMAIL.COM

Transfer subscriptions - backend

SENDING MESSAGE TO FIRST SOURCE OF FIRST SUBSCRIPTION AND SECOND SOURCE OF SECOND SUBSCRIPTION:

TRANSFER SUBSCRIPTION OF USER121@EXISTINGMAIL.COM TO ⟵ 556
NEWUSER@NEWMAIL.COM

FIG. 5G

SUBSCRIPTION TRANSFER

BACKGROUND

Many services, such as email services, apps, social networks, etc., may allow a user to create an account capable of sending and receiving messages. The services often provide the accounts for free, which has led to an increase in users creating more than one account of a same type (e.g., email). For example, a user may initially create a first account for sending and receiving messages, and use the first account for multiple purposes, such as work, school, and personal messages.

SUMMARY

The user may later find that more important messages, such as work and school messages, are harder to find and/or notice amongst the less important messages, such as personal messages, and may thus decide to create a second account for personal messages.

The personal messages of the user may include messages from friends and family, as well as messages that the user may have subscribed to receive periodically, such as newsletters, coupons, news bulletins, etc. The user may be able to inform the friends and family of the second account by sending a message directing them to conduct future correspondence with the second account. However, the messages that the user receives periodically may often be sent automatically (e.g., to a list of subscribers including the user), and thus the subscriptions may not easily be modified by the user merely manually drafting and sending a message. Instead, modification of each of the subscriptions may require its own particular steps that may involve accessing a website of the subscription, locating a page on the website pertaining to subscriptions, manually entering information about the first account to unsubscribe from receiving messages at the first account, and manually entering information about the second account to subscribe to receiving messages at the second account. It may be appreciated that modifying multiple subscriptions from being sent to the first account (e.g., which the user now wants to use exclusively for work and school purposes) to being sent to the second account (e.g., which the user may create for personal purposes) may be an arduous and tedious process.

In accordance with the present disclosure, one or more computing devices and/or methods for transferring subscriptions from a first account to a second account are provided. In an example, a first request associated with a transfer of subscriptions (e.g., newsletters, coupons, etc.) from a first account (e.g., corresponding to a first email address) to a second account (e.g., corresponding to a second email address) may be received (e.g., by a server) from a user. A second request for access information (e.g., username, password, etc.) associated with the first account may be provided (e.g., by the server) to the user. The access information associated with the first account may be received (e.g. by the server) from the user. The access information associated with the first account may be used (e.g. by the server) to access a first storage space (e.g., a first mailbox) of the first account. A plurality of subscriptions associated with the first account may be identified (e.g. by the server) based upon the first storage space (e.g., by scanning a header, a body, etc. of one or more messages in the first storage space). A first subscription and a second subscription of the plurality of subscriptions may be transferred (e.g. by the server) from the first account to the second account (e.g., by copying one or more stored messages from the first storage space of the first account to a second storage space of the second account, providing a first notification to a first source of the first subscription to transfer the first subscription from the first account to the second account, etc.).

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 5A is a component block diagram illustrating an example system for transferring subscriptions from a first account to a second account, where a user is making a first request.

FIG. 5C is a component block diagram illustrating an example system for transferring subscriptions from a first account to a second account, where the access information is used to access a first storage space of the first account.

FIG. 5D is a component block diagram illustrating an example system for transferring subscriptions from a first account to a second account, where a plurality of subscriptions associated with the first account are identified based upon the first storage space.

FIG. 5F is a component block diagram illustrating an example system for transferring subscriptions from a first account to a second account, where one or more stored messages associated with at least one of the first subscription or the second subscription are requested to be copied from the first storage space to a second storage space of the second account, and one or more rules are created to copy, from the first storage space to the second storage space, one or more new messages received after the copying the one or more stored messages and associated with at least one of the first subscription or the second subscription.

FIG. 5G is a component block diagram illustrating an example system for transferring subscriptions from a first account to a second account, where a notification is provided to a first source of the first subscription and a second source of the second subscription to transfer the first subscription and the second subscription from the first account to the second account.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
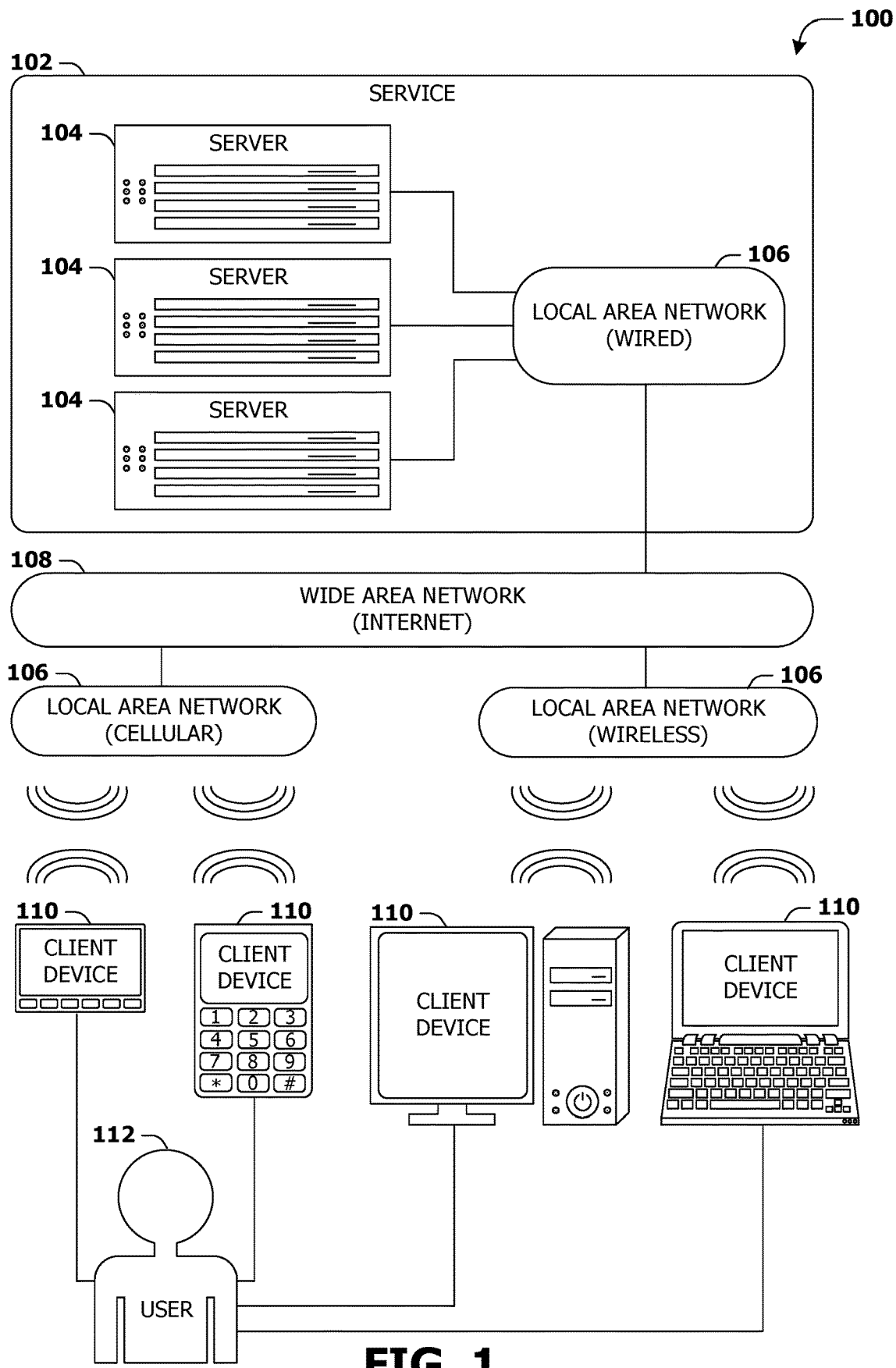
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
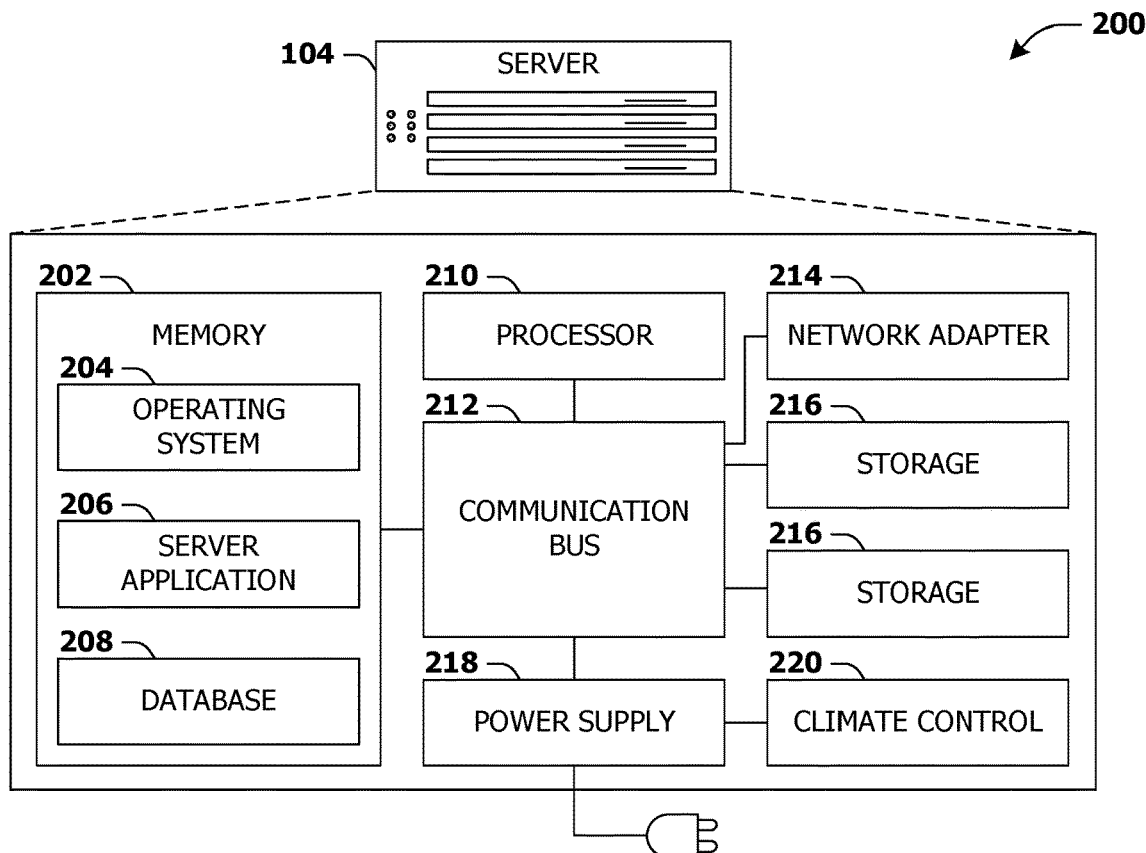
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system.

The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
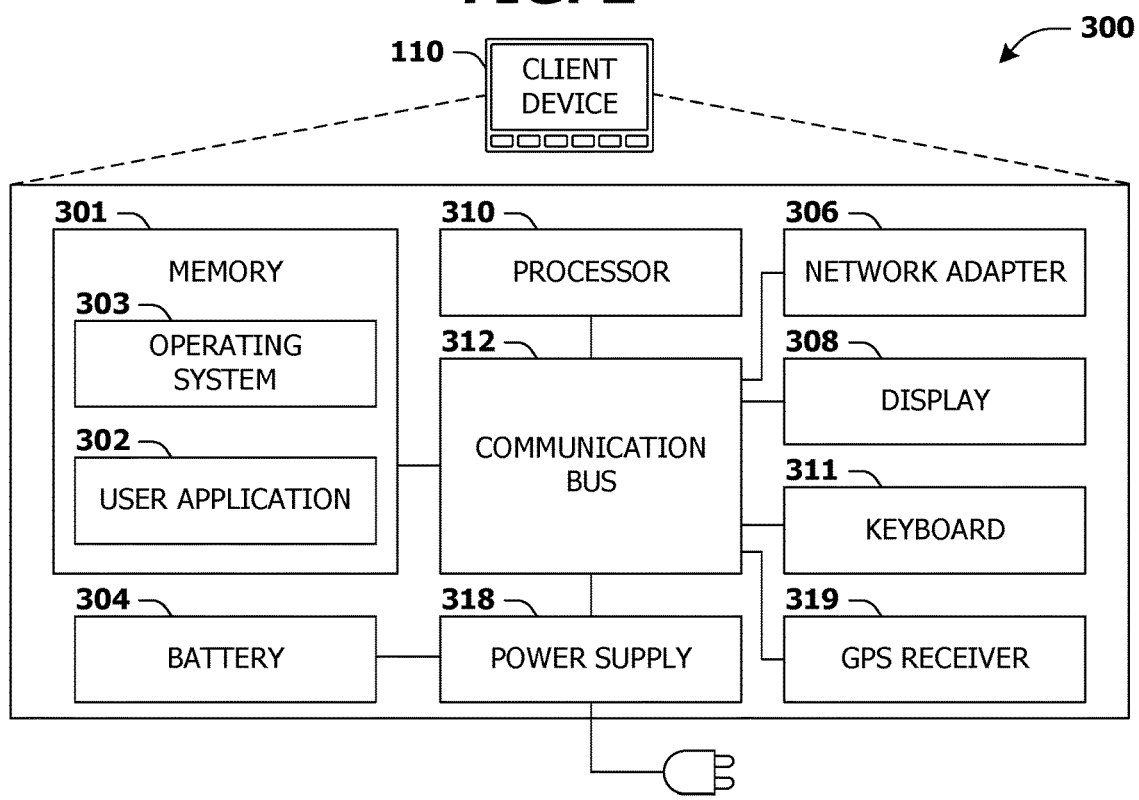
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for transferring subscriptions are provided. For example, a user may want to transfer a plurality of subscriptions from a first account to a second account. Transferring the subscriptions may use and/or require contacting one or more sources of the subscriptions, and thus may consume a significant amount of time and/or resources of the user (e.g., to find a first source of a first subscription, to contact the first source, to communicate a desire of the user to transfer the first subscription to the first source, to find a second source of a second subscription, to contact the second source, to communicate a desire of the user to transfer the second subscription to the second source, etc.). Available methods, such as manually contacting a source of each subscription, may provide limited assistance, and may thus be too difficult, labor-intensive, time consuming and/or imprecise to perform (e.g., a user with many subscriptions may overlook a subscription, fail to successfully transfer the subscription, etc.). Thus, in accordance with one or more of the techniques presented herein, subscriptions may be transferred in a manner that is efficient, convenient, low cost and/or timely. Similarly, as provided herein, a service that works with a service for sending and receiving messages may be used to assist the user in transferring the plurality of subscriptions concurrently.

Figure 4A:
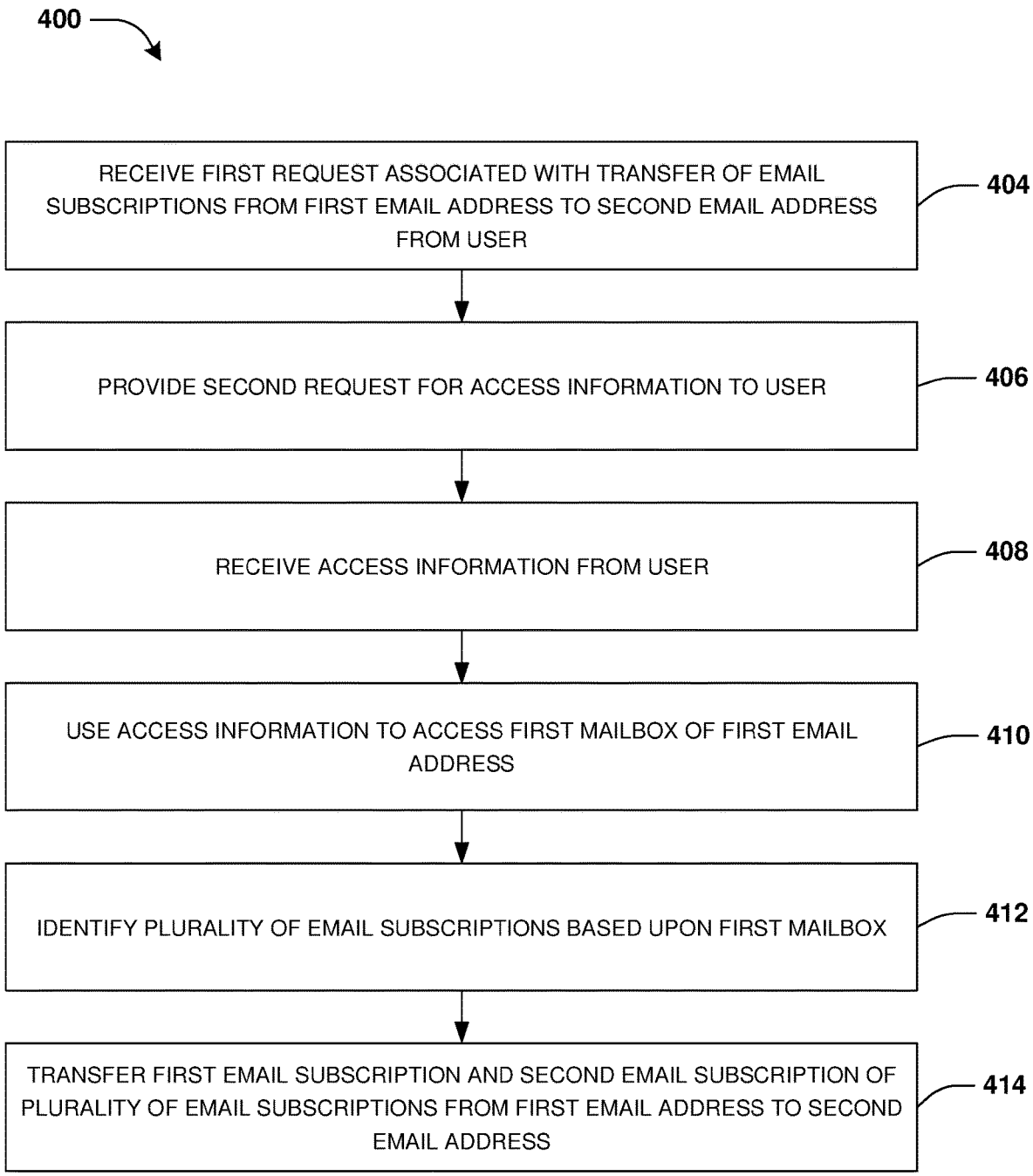
FIG. 4A is a flow chart illustrating an example method for transferring subscriptions from a first account to a second account.

An embodiment of transferring subscriptions is illustrated by an example method 400 of FIG. 4A (e.g., from the perspective of a server). A user, such as user Jill, (e.g., and/or a device associated with the user) may access and/or interact with a service for sending and receiving messages, such as an email service, a social network, an instant messaging service, etc. An account of the user with the service may be accessed and/or interacted with via one or more interfaces on a device of the user, such as a browser, an app, an email client, or another interface on a device. Accordingly, at 404, a first request associated with a transfer of email subscriptions from a first email address to a second email address may be received (e.g., by a server of the service) from the user (e.g., and/or the device associated with the user) (e.g., via the browser, the app, the email client, etc.). In an example, the request may be made while creating a new account. In another example, the request may be made after the user already has two or more operational accounts (e.g., after the service suggests the transfer based upon determining that a number of subscriptions of the user or a frequency of subscriptions received by the user exceeds a threshold). The request may, for example, be made by making one or more selections on a webpage by the user.

At 406, a second request for access information (e.g., a username, a password, two-factor authentication, a code provided to a different device, etc.) associated with the first email address may be provided to the user (e.g., and/or the device associated with the user) (e.g., via the browser, the app, the email client, etc.). At 408, the access information associated with the first email address may be received from the user (e.g., and/or the device associated with the user). For example, the user (e.g., and/or the device associated with the user) may enter the access information into one or more input boxes on a page of the service.

At 410, the access information associated with the first email address may be used (e.g., by the service) to access a first mailbox of the first email address. For example, the service may provide a username and/or a password from the access information to a server hosting the first mailbox and/or the first email address, and may request access to and/or information about the first mailbox in exchange. The service may access the first mailbox via an Internet Message Access Protocol (IMAP) connection, a Post Office Protocol (POP) connection, an HTTP connection and/or one or more other types of connections.

At 412, a plurality of email subscriptions associated with the first email address may be identified based upon the first mailbox. For example, one or more messages stored in the first mailbox may be scanned and/or analyzed to identify messages determined to be likely to have been received by the user (e.g., and/or the device associated with the user) as part of a subscription. For example, a header, a subject line, a body, a sender (e.g., in a From field) and/or a recipient (e.g., in a To field, a CC field, a BCC field, etc.) may be scanned for one or more indications (e.g., a list-unsubscribe header, senders known to provide subscriptions, keywords such as "unsubscribe," "to stop receiving these messages," etc.) associated with subscriptions. In another example, the one or more messages stored in the first mailbox may be compared (e.g., with one another) to identify a pattern associated with subscriptions. For example, messages from a common source received at same and/or similar intervals (e.g., daily, weekly, monthly, etc.) may be determined to be likely to be received as part of a subscription. It may be appreciated that an aggregate analysis of multiple (e.g., a bulk number of email) mailboxes (e.g., belonging to various users) (e.g., hosted by a first host of the first email address, a second host of the second email address, both the first host and the second host, etc.) may be performed to identify one or more subscriptions (e.g., such that a same or similar message identified in more than one mailbox may be determined to be likely to be received as part of a subscription).

At 414, a first email subscription and a second email subscription of the plurality of email subscriptions may be (e.g., concurrently) transferred from the first email address to the second email address.

In an example of transferring the first email subscription and the second email subscription from the first email address to the second email address, one or more stored email messages associated with at least one of the first email subscription or the second email subscription may be copied from the first mailbox to a second mailbox of the second email address. In addition to the copying, one or more rules may be created (e.g., and/or provided) (e.g., by the service, and/or by the host of the first mailbox) to copy, from the first mailbox to the second mailbox, one or more new email messages that are received after the copying the one or more stored email messages and that are associated with at least one of the first email subscription or the second email subscription. In such an example, after the transferring of the first email subscription and/or the second email subscription from the first email address to the second email address, the first email address may continue to receive new email messages associated with the first email subscription and/or the second email subscription, but may (e.g., immediately) provide a copy of the new email messages to the second email address (e.g., and delete and/or not store the new email messages in the second mailbox).

In an example of transferring the first email subscription and the second email subscription from the first email address to the second email address, a first notification to transfer the first email subscription from the first email address to the second email address may be provided to a first source of the first email subscription, and/or a second notification to transfer the second email subscription from the first email address to the second email address may be provided to a second source of the second email subscription (e.g., in addition to the copying). The providing the first notification may comprise providing a first notification email message to the first source, where a first header of the first notification email message may comprise a third request to transfer the first email subscription from the first email address to the second email address in accordance with a first protocol. The providing the second notification may comprise providing a second notification email message to the second source, where a second header of the second notification email message may comprise a fourth request to transfer the second email subscription from the first email address to the second email address in accordance with the first protocol. It may be appreciated that the first (e.g., change of address) protocol may provide for a field describing a command (e.g. using email, a URL, etc.) to end the association of an email address with an email subscription, and/or to start a new association of another email address with the email subscription. In some examples, upon transferring the first email subscription and/or the second email subscription from the first email address to the second email address, a first email message may be provided to the first email address and/or the second email address indicative of the transfer and/or including a link to be selected if the transfer was unauthorized, unintended, etc.

In an example, after the identifying a plurality of email subscriptions associated with the first email address and/or prior to the transferring the first email subscription and/or the second email subscription from the first email address to the second email address, a list of the plurality of email subscriptions may be provided to the user (e.g., and/or the device associated with the user). For example, the list of the plurality of email subscriptions may comprise the first email subscription, the second email subscription, a third email subscription, etc. It may be appreciated that the list of the plurality of email subscriptions may be presented in an order based upon frequency of messages received for each email subscription, recency of messages received for each email subscription, and/or one or more other factors determined to be important based upon the behavior, choices, selections etc. of the user (e.g., and/or the device associated with the user) and/or other users (e.g., determined to be similar to the user). A selection of the first email subscription and the second email subscription (e.g., but not the third email subscription) by the user (e.g., and/or the device associated with the user) from the list may be received, and the transferring the first email subscription and the second email subscription (e.g., but not the third email subscription) may be performed based upon the selection. The third email subscription (e.g., and/or one or more other email subscriptions not selected) may be unaltered (e.g., such that they continue to be received by the first email address), or they may be ended (e.g., such that they are no longer received by the first email address).

It may be appreciated that the first request associated with the transfer of email subscriptions from the first email address to the second email address may further be associated with a transfer of email subscriptions from a third email address (e.g., of the user) to the second email address. For example, the user may want to transfer email subscriptions from a plurality of (e.g., existing) email addresses to one or more (e.g., new) email addresses.

In an example, a third request for access information associated with the third email address may be provided to the user (e.g., and/or the device associated with the user) (e.g., concurrently with and/or after providing the second request to the user). The access information associated with the third email address may be received from the user (e.g., and/or the device associated with the user) (e.g., concurrently with and/or after receiving the access information associated with the first email address from the user). The access information associated with the third email address may be used to access a third mailbox of the third email address (e.g., concurrently with and/or after using the access information associated with the first email address to access the first mailbox of the first email address). A plurality of email subscriptions associated with the third email address may be identified based upon the third mailbox (e.g., concurrently with and/or after identifying the plurality of email subscriptions associated with the first email address based upon the first mailbox).

In an example, a combined list of the plurality of email subscriptions associated with the first email address and the plurality of email subscriptions associated with the third email address may be provided to the user (e.g., and/or the device associated with the user). The user may, for example, select one or more of the plurality of email subscriptions from the combined list to transfer to the second email address.

In another example, one or more redundant (e.g., overlapping) email subscriptions between the plurality of email subscriptions associated with the first email address and the plurality of email subscriptions associated with the third email address may be determined (e.g., by comparing the plurality of email subscriptions associated with the first email address and the plurality of email subscriptions associated with the third email address). A combined list of the plurality of email subscriptions associated with the first email address and the plurality of email subscriptions associated with the third email address may be provided to the user (e.g., and/or the device associated with the user), where the combined list may exclude and/or highlight the one or more redundant email subscriptions (e.g., preventing the user from having a same subscription be sent to the second email address more than once). It may be appreciated that the user (e.g., and/or the device associated with the user) may provide input indicating how to resolve and/or handle the redundancies.

Figure 4B:
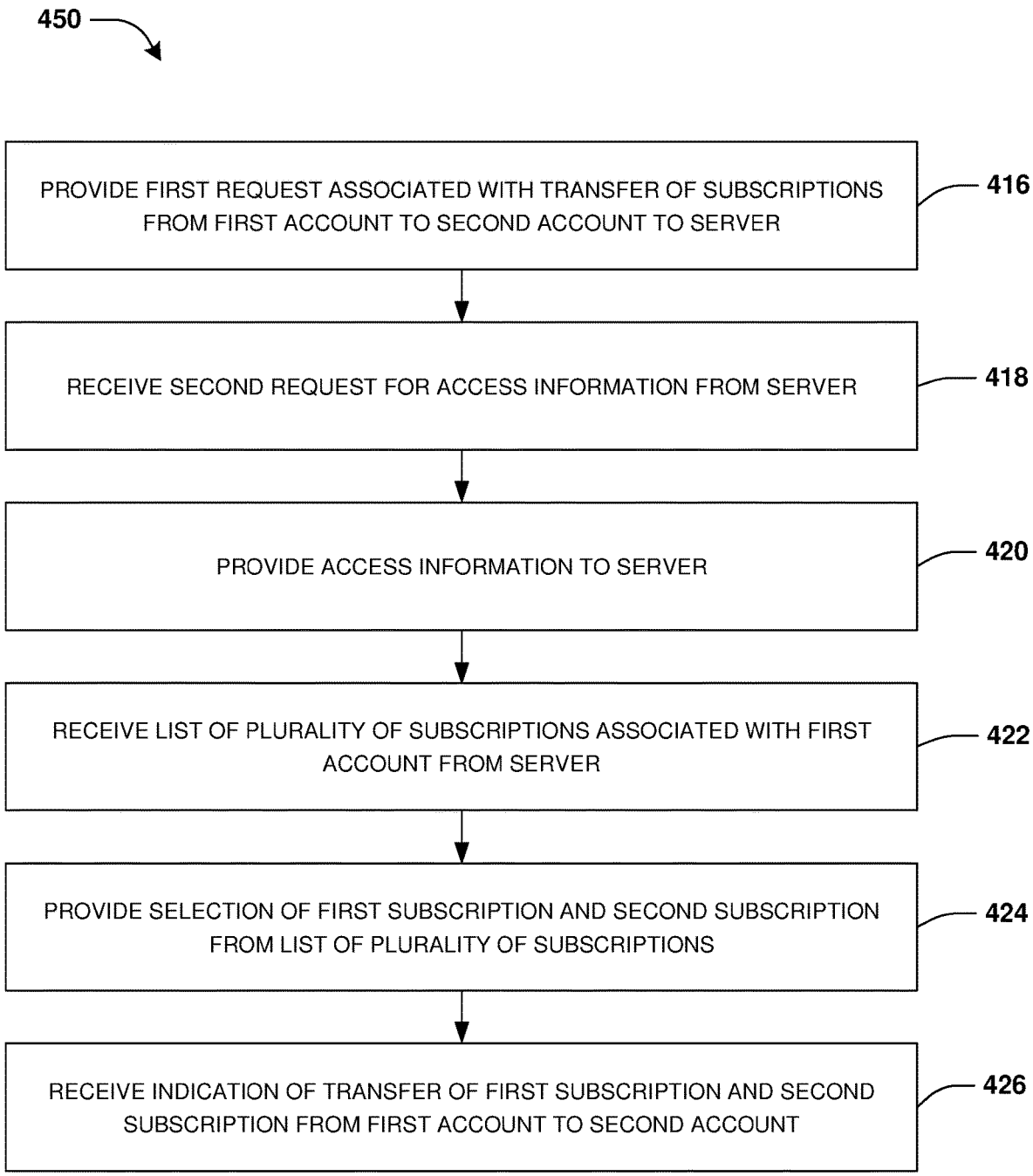
FIG. 4B is a flow chart illustrating an example method for transferring subscriptions from a first account to a second account.

Another embodiment of transferring subscriptions is illustrated by an example method 450 of FIG. 4B (e.g., from the perspective of a device of a user). At 416, a first request associated with a transfer of subscriptions from a first account to a second account may be provided (e.g., by the user and/or the device associated with the user) to a server (e.g., of a service) (e.g., via the browser, the app, the email client, etc.). At 418, a second request for access information (e.g., a username, a password, two-factor authentication, a code provided to a different device, etc.) associated with the first account may be received (e.g., from the server) by the user (e.g., and/or the device associated with the user) (e.g., via the browser, the app, the email client, etc.). At 420, the access information associated with the first account may be provided (e.g., by the user and/or the device associated with the user) to the server (e.g., to access a first storage space of the first account). At 422, a list of a plurality of subscriptions associated with the first account may be received from the server (e.g., by the user and/or the device associated with the user) based upon the first storage space of the first account. At 424, a selection of a first subscription and a second subscription from the list of the plurality of subscriptions may be provided to the server. At 426, an indication of a transfer of the first subscription and the second subscription from the first account to the second account may be received (e.g., by the user and/or the device associated with the user, from the server, etc.). For example, the user (e.g., and/or the device associated with the user) may receive a confirmation (e.g., web) page indicating that the first subscription and the second subscription were successfully transferred from the first account to the second account.

Figure 5B:
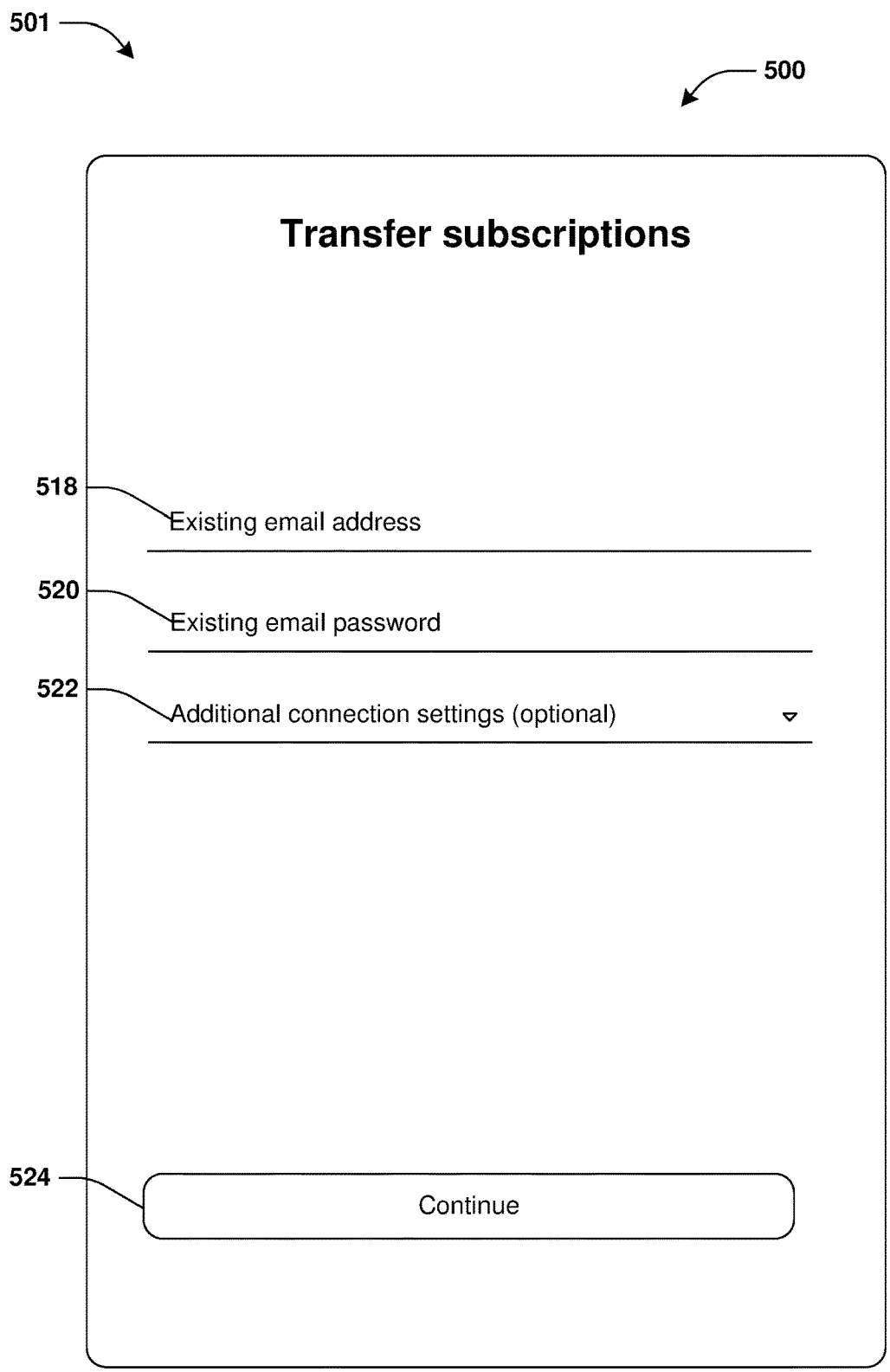
FIG. 5B is a component block diagram illustrating an example system for transferring subscriptions from a first account to a second account, where the user is providing access information.

FIGS. 5A-5H illustrate examples of a system 501 for transferring subscriptions. FIG. 5A illustrates an interface 500 that may be displayed on a device of a user. The interface 500 may, in some examples, be part of a process of creating a new email address (e.g., and/or other new account), and may comprise a name input area 502, an email address input area 504, a password input area 506, a phone number input area 508, a birth date input area 510 and/or a gender input area 512. The user may make a selection 514 indicating a desire to transfer subscriptions from an existing email address (e.g., and/or other existing account) to the new email address. The user may select a (e.g., continue) button 516 to submit information entered into the interface 500 to a server, for example.

FIG. 5B illustrates a second page of the interface 500 that may be displayed on the device of the user (e.g., after the user selects the button 516 displayed in FIG. 5A). The interface 500 may comprise an existing email address input area 518 (e.g., which may be pre-filled based upon the information entered by the user into email address input area 504), an existing email password input area 520 (e.g., within which a password used to access the existing email address may be entered) and/or an additional connection settings input area 522 (e.g., within which the user may designate an email server and/or URL to access the existing email address through, a type of connection (e.g., IMAP, POP, etc.) to establish, a level of security (e.g., Secure Sockets Layer (SSL), Transport Layer Security (TLS), etc.) to use, etc.). The user may select a (e.g., continue) button 524 to submit information entered into the interface 500 to the server, for example.

FIG. 5C illustrates a backend system 550 using an existing email address 526 (e.g., received from the user and/or the device associated with the user via existing email address input area 518) and/or an existing email password 528 (e.g., received from the user and/or the device associated with the user via existing email address input area 520) to determine an email server 530 associated with the existing email address 526 and/or to send a message to the email server 530. The message may comprise a request 532 for access to a mailbox (e.g., and/or other storage space) of the existing email address 526 and/or access information 534 (e.g., a username comprising a truncated version of the existing email address 526, the existing email password 528, etc.) used to access the existing email address 526.

FIG. 5D illustrates the backend system 550 receiving and/or otherwise accessing an inventory 536 of some or all email messages stored for the existing email address 526 (e.g., from the email server 530). It may be appreciated that the inventory 536 may comprise (e.g., a copy of) entire messages, or merely one or more portions and/or metadata of email messages, such as information about a date sent and/or received, sender information, recipient information, subject information, keywords identified, etc. The inventory 536 may be analyzed (e.g., for patterns, keywords, etc.) to identify a first subscription 538, a second subscription 540 and/or a third subscription 542 of the user.

Figure 5E:
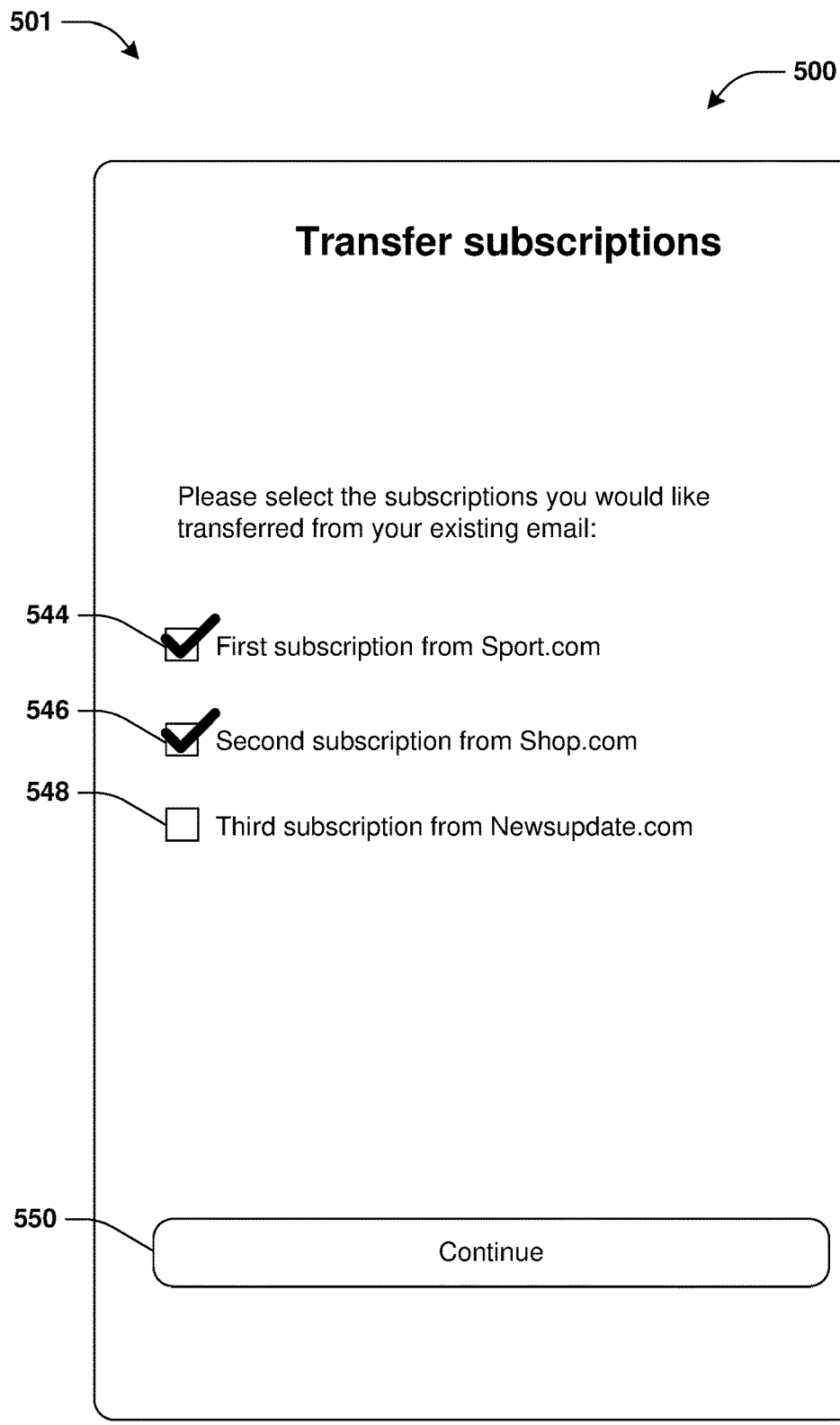
FIG. 5E is a component block diagram illustrating an example system for transferring subscriptions from a first account to a second account, where a list of the plurality of subscriptions is provided to the user.

FIG. 5E illustrates a third page of the interface 500 that may be displayed on the device of the user (e.g., after the user selects the button 524 displayed in FIG. 5B). The user may make a selection 544 indicating a desire to transfer the first subscription 538 from the existing email address 526 (e.g., and/or other existing account) to the new email address and/or a selection 546 indicating a desire to transfer the second subscription 540 from the existing email address 526 (e.g., and/or other existing account) to the new email address. The user may make a selection (e.g., and/or no selection) 548 indicating a lack of a desire to transfer a third subscription from the existing email address 526 (e.g., and/or other existing account) to the new email address. The user may select a (e.g., continue) button 550 to submit information entered into the interface 500 to the server, for example.

FIG. 5F illustrates an embodiment of the backend system 550 sending a message to the email server 530. The message may comprise a request 552 to copy messages associated with the first subscription and/or the second subscription from the mailbox (e.g., and/or other storage space) of the existing email address 526 (e.g., to a mailbox of the new email address). The message may alternatively and/or additionally comprise a request 554 to create a rule to copy messages received at a later time (e.g., after the sending of the message) that are associated with the first subscription and/or the second subscription from the mailbox (e.g., and/or other storage space) of the existing email address 526 (e.g., to a mailbox of the new email address).

FIG. 5G illustrates another embodiment of the backend system 550 sending a message to a first source of the first subscription and/or a second source of the second subscription. The message may comprise a request 556 to transfer the first subscription and/or the second subscription from the existing email address 526 to the new email address. It may be appreciated that the first source and/or the second source may be identified from a To field (e.g., and/or one or more other fields) of one or more messages associated with the first subscription and/or the second subscription, and/or may be determined by searching a database.

Figure 5H:
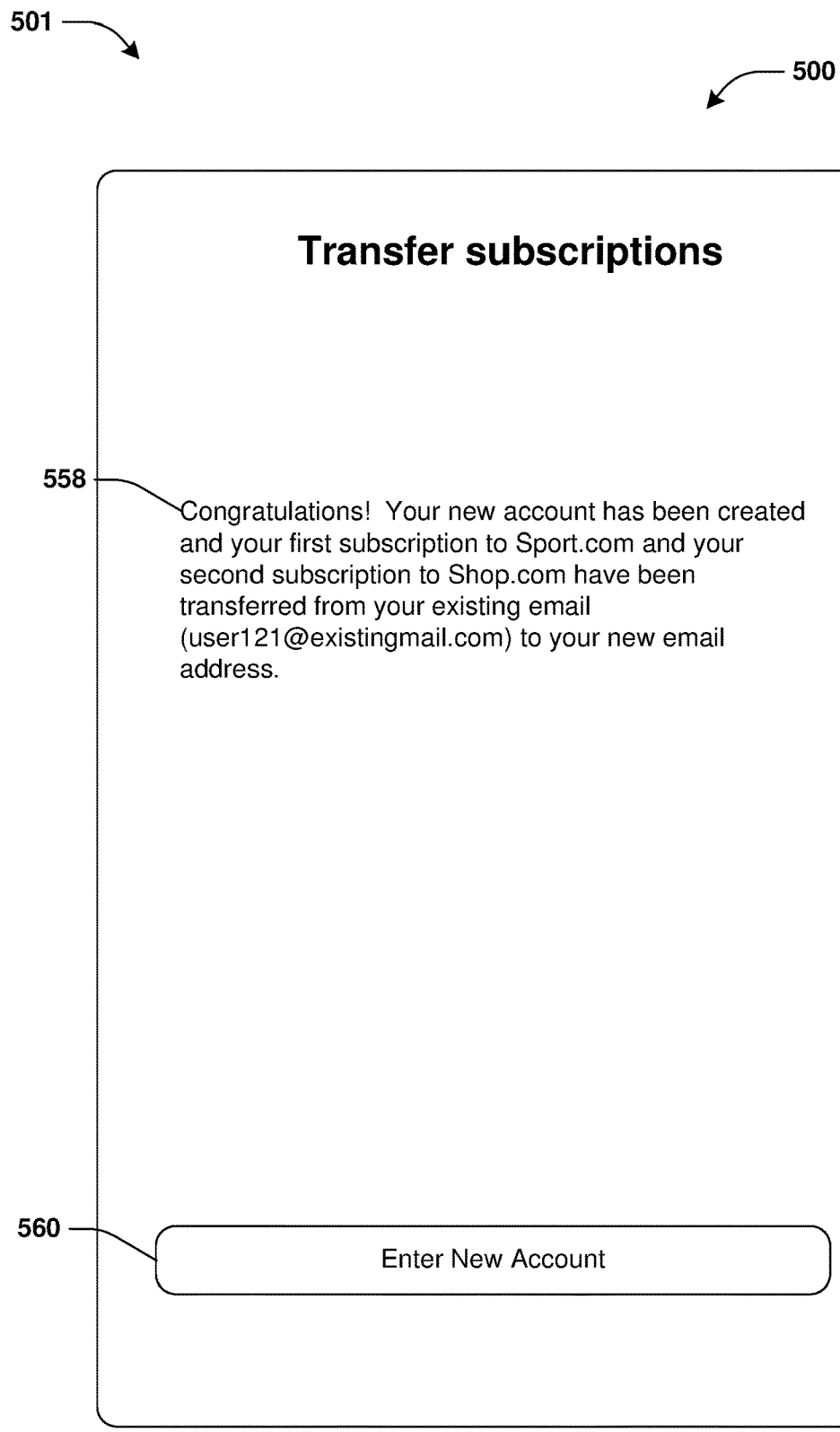
FIG. 5H is a component block diagram illustrating an example system for transferring subscriptions from a first account to a second account, where the user receives an indication of a transfer of the first subscription and the second subscription from the first account to the second account.

FIG. 5H illustrates the receipt, by the user (e.g., and/or the device associated with the user), of a confirmation 558 of transfer of the first subscription and/or the second subscription from the existing email address 526 to the new email address. For example, the confirmation 558 may include details about the transfer, such as an indication of which messages were copied and/or were not copied, a time that the transfer is expected to be completed, an indication of what type of transfer was performed for each subscription (e.g., a rule-based transfer wherein the subscription is still directed to the existing email address 526 and then copied to the new email address, vs. a complete transfer wherein the subscription is no longer directed to the existing email address 526 and is instead directed to the new email address, etc.), etc. The user may select a (e.g., continue) button 560 to access a mailbox of the new email address (e.g., which may include messages copied from the mailbox of the existing email address 526), for example.

In an example, when the user (e.g., and/or the device associated with the user) accesses a first email message originally directed to the existing email address 526 but copied to the mailbox of the new email address, and the user selects a link and/or button corresponding to unsubscribing and/or modifying a subscription (e.g., associated with the first email message), a determination may be made that successful unsubscription would require providing the existing email address 526 (e.g., rather than the new email address) to an unsubscribe input area, and the unsubscribe input area may automatically be filled with the existing email address 526.

It may be appreciated that the disclosed subject matter may assist a user (e.g., and/or the device associated with the user) in transferring subscriptions on (e.g., and/or across) various communication platforms including but not limited to email (e.g., between email addresses), social networks (e.g., between social network identities, via their messaging components, between their groups, etc.), messaging apps (e.g., between messaging identities), etc.

Implementation of at least some of the disclosed subject matter may lead to benefits including, but not limited to, reduction of bandwidth used as a result of a decrease in log-ins (e.g., to different email accounts) by a user (e.g., and/or a device associated with the user), improvement in the speed of accessing desired data (e.g., email messages), a reduction in storage used and/or bandwidth used by reducing the redundancy of subscriptions across different accounts of a same user, reducing the need for storing and/or memorizing multiple passwords (e.g., and mitigating the security challenges associated with this need) and/or reducing storage and bandwidth wasted on email accounts that still receive subscriptions and/or other messages but are no longer accessed by a user (e.g., and/or a device associated with the user) (e.g., due to a lost password, lack of time, etc.).

In some examples, at least some of the disclosed subject matter may be implemented on a client (e.g., a device of a user), and in some examples, at least some of the disclosed subject matter may be implemented on a server (e.g., hosting a service accessible via a network, such as the Internet).

Figure 6:
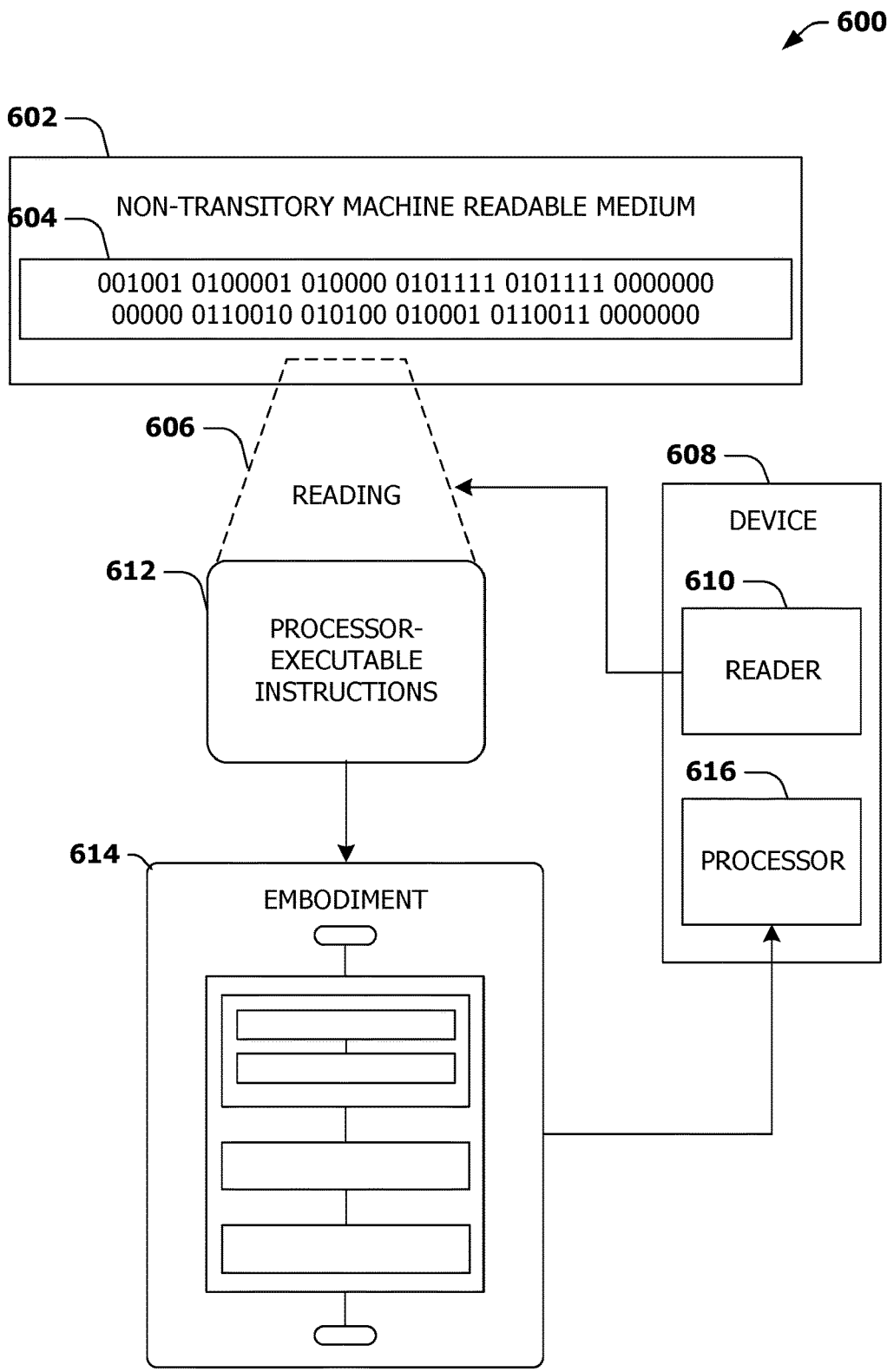
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4A and/or the example method 450 of FIG. 4B, for example. In some embodiments, the processor-executable instructions 612 are configured to cause implementation of a system, such as at least some of the example system 501 of FIGS. 5A-5H, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method involving a server comprising a processor, and the method comprising:
   receiving, from a device associated with a user, a first request associated with a transfer of email subscriptions from a first email address to a second email address, wherein the first request is associated with creating the second email address to which email subscriptions are requested to be transferred;
   responsive to receiving the first request, providing, to the device, a second request for access information associated with the first email address;
   receiving, from the device, the access information associated with the first email address;
   using the access information associated with the first email address to access a first mailbox of the first email address;
   responsive to accessing the first mailbox, scanning messages stored in the first mailbox to identify one or more messages likely to have been received by the user as part of a subscription, wherein the identifying comprises comparing one or more first messages stored in the first mailbox with one or more second messages stored in the first mailbox to identify one or more patterns associated with one or more subscriptions, wherein the identifying one or more patterns comprises determining that a first interval between reception of a first message of the one or more messages and reception of a second message of the one or more messages is at least one of the same as or similar to a second interval between reception of the second message of the one or more messages and reception of a third message of the one or more messages;
   identifying a plurality of email subscriptions associated with the first email address based upon the one or more messages likely to have been received by the user as part of a subscription; and
   transferring a first email subscription and a second email subscription of the plurality of email subscriptions from the first email address to the second email address.

2. The method of claim 1, the transferring comprising:
   copying one or more stored email messages associated with at least one of the first email subscription or the second email subscription from the first mailbox to a second mailbox of the second email address.

3. The method of claim 2, the transferring comprising:
   creating one or more rules to copy, from the first mailbox to the second mailbox, one or more new email messages received after the copying the one or more stored email messages and associated with at least one of the first email subscription or the second email subscription.

4. The method of claim 1, the transferring comprising:
   providing a first notification to a first source of the first email subscription to transfer the first email subscription from the first email address to the second email address; and
   providing a second notification to a second source of the second email subscription to transfer the second email subscription from the first email address to the second email address.

5. The method of claim 4,
   the providing a first notification comprising providing a first notification email message to the first source; and
   the providing a second notification comprising providing a second notification email message to the second source.

6. The method of claim 5, a first header of the first notification email message comprising a third request to transfer the first email subscription from the first email address to the second email address in accordance with a first protocol, a second header of the second notification email message comprising a fourth request to transfer the second email subscription from the first email address to the second email address in accordance with the first protocol.

7. The method of claim 1, the transferring comprising:
   copying one or more stored email messages associated with at least one of the first email subscription or the second email subscription from the first mailbox to a second mailbox of the second email address;
   providing a first notification to a first source of the first email subscription to transfer the first email subscription from the first email address to the second email address; and
   providing a second notification to a second source of the second email subscription to transfer the second email subscription from the first email address to the second email address.

8. The method of claim 1, comprising, after the identifying a plurality of email subscriptions and before the transferring:
   providing, to the device, a list of the plurality of email subscriptions; and
   receiving, from the device, a selection of the first email subscription and the second email subscription from the list, the transferring performed based upon the selection.

9. The method of claim 1, the first request also associated with a transfer of email subscriptions from a third email address to the second email address.

10. The method of claim 9, comprising:
    providing, to the device, a third request for access information associated with the third email address;
    receiving, from the device, the access information associated with the third email address;
    using the access information associated with the third email address to access a third mailbox of the third email address; and
    identifying a plurality of email subscriptions associated with the third email address based upon the third mailbox.

11. The method of claim 10, comprising:
    providing, to the device, a combined list of the plurality of email subscriptions associated with the first email address and the plurality of email subscriptions associated with the third email address.

12. The method of claim 10, comprising:
    determining one or more redundant email subscriptions between the plurality of email subscriptions associated with the first email address and the plurality of email subscriptions associated with the third email address.

13. The method of claim 1, wherein the identifying one or more patterns comprises determining that the one or more first messages and the one or more second messages were received from a common source.

14. The method of claim 1, comprising:
    performing an aggregate analysis of multiple mailboxes, comprising the first mailbox of the user and a second mailbox of a second user, to identify at least one email subscription, wherein the aggregate analysis identifies at least one of a same message or a similar message in the first mailbox of the user and the second mailbox of the second user; and transferring the at least one email subscription from the first email address to the second email address.

15. A computing device comprising:

a processor; and memory comprising processor-executable instructions that when executed by the processor cause performance of operations, the operations comprising:

receiving, from a device associated with a user, a first request associated with a transfer of subscriptions from a first account to a second account;

responsive to receiving the first request, providing, to the device, a second request for access information associated with the first account;

receiving, from the device, the access information associated with the first account;

using the access information associated with the first account to access a first storage space of the first account;

responsive to accessing the first storage space, scanning messages stored in the first storage space to identify one or more messages likely to have been received by the user as part of a subscription, wherein the identifying comprises comparing one or more first messages stored in the first storage space with one or more second messages stored in the first storage space to identify one or more patterns associated with one or more subscriptions, wherein the identifying one or more patterns comprises determining that a first interval between reception of a first message of the one or more messages and reception of a second message of the one or more messages is at least one of the same as or similar to a second interval between reception of the second message of the one or more messages and reception of a third message of the one or more messages;

identifying a plurality of subscriptions associated with the first account based upon the one or more messages likely to have been received by the user as part of a subscription; and transferring a first subscription and a second subscription of the plurality of subscriptions from the first account to the second account.

16. The computing device of claim 15, the first account corresponding to a first email address and the second account corresponding to a second email address.

17. The computing device of claim 15, the first account corresponding to a first social network identity and the second account corresponding to a second social network identity.

18. The computing device of claim 15, the first account corresponding to a first messaging identity and the second account corresponding to a second messaging identity.

19. A non-transitory machine readable medium having stored thereon processor-executable instructions that when executed cause performance of operations, the operations comprising:

providing, to a server, a first request associated with a transfer of subscriptions from a first account to a second account;

responsive to providing the first request, receiving, from the server, a second request for access information associated with the first account;

providing, to the server, the access information associated with the first account;

receiving, from the server, a list of a plurality of subscriptions associated with the first account based upon a scanning of messages stored in a first storage space of the first account to identify one or more messages likely to have been received as part of a subscription, wherein the identifying comprises comparing one or more first messages stored in the first storage space with one or more second messages stored in the first storage space to identify one or more patterns associated with one or more subscriptions, wherein the identifying one or more patterns comprises determining that a first interval between reception of a first message of the one or more messages and reception of a second message of the one or more messages is at least one of the same as or similar to a second interval between reception of the second message of the one or more messages and reception of a third message of the one or more messages;

providing, to the server, a selection of a first subscription and a second subscription from the list of the plurality of subscriptions; and receiving an indication of a transfer of the first subscription and the second subscription from the first account to the second account.

20. The non-transitory machine readable medium of claim 19, at least one of:

the first account corresponding to a first email address and the second account corresponding to a second email address;

the first account corresponding to a first social network identity and the second account corresponding to a second social network identity; or the first account corresponding to a first messaging identity and the second account corresponding to a second messaging identity.

* * * * *